Figure 1:
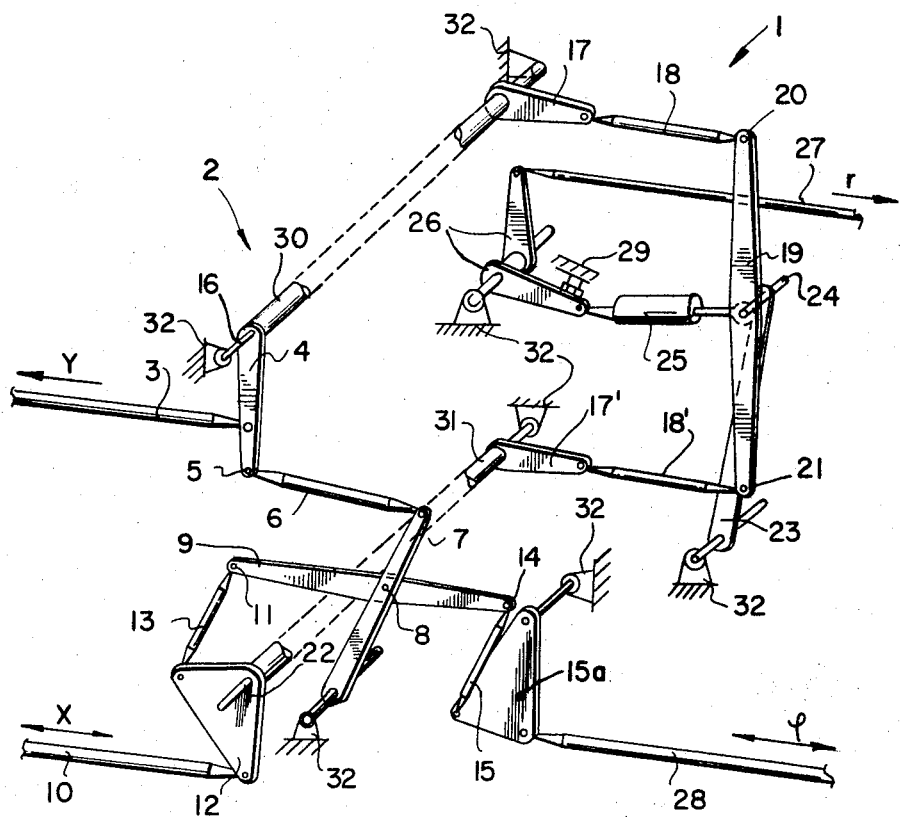

United States Patent [19]
Stauber et al.

[11] 3,709,056
[45] Jan. 9, 1973

[54] COORDINATE TRANSFORMER FOR TRANSFORMING CONTROL SIGNALS IN AIRPLANES

[75] Inventors: Siegfried Stauber, Weingarten; Klaus Suttner, Stetten, both of Germany

[73] Assignee: Dornier A. G., Friedrickafen/Bodensee, Germany

[22] Filed: Jan. 18, 1971

[21] Appl. No.: 107,100

[30] Foreign Application Priority Data

Feb. 27, 1970 Germany..................P 20 09 145.6

[52] U.S. Cl. ..................74/469, 74/479, 244/83 B
[51] Int. Cl. ..............................................G05g 1/04
[58] Field of Search .........74/469, 479; 244/838, 836

[56] References Cited

UNITED STATES PATENTS

| | | | |
|---|---|---|---|
| 2,338,379 | 1/1944 | Henke | 244/83 C |
| 3,199,601 | 8/1965 | Dean et al. | 74/469 X |
| 3,327,552 | 6/1967 | Broders et al. | 74/469 |

Primary Examiner—Milton Kaufman
Attorney—James E. Bryan

[57] ABSTRACT

The disclosure is of a coordinate transformer for transforming control signals for airplanes, particularly for transforming Cartesian input signals into polar output signals, which have, in addition to a thrust control element, a thrust direction control element or operating member for controlling the thrust components and for uncoupling control axles. This is achieved by the use of two multi-sectional coupling gears or linkages, one linkage determining therein the distance r, while the other linkage determines the respectively coordinated angle α toward the polar axis from the two Cartesian x-y input signals.

2 Claims, 2 Drawing Figures

INVENTORS
SIEGFRIED STAUBER
KLAUS SUTTNER

BY James E. Bryan

ATTORNEY

COORDINATE TRANSFORMER FOR TRANSFORMING CONTROL SIGNALS IN AIRPLANES

The present invention relates to a coordinate transformer for the transformation of control signals in aircraft, particularly for transforming Cartesian input signals into polar output signals, which have, in addition to a thrust control element or operating member, a thrust direction control element for regulating the thrust components and for uncoupling control axles.

Coordinate transformers serve for transforming or converting control signals which are fed into airplanes according to the Cartesian coordinate system but are intended to execute movements according to the polar coordinate system. Without the presence of a coordinate transformer, the pilot would have to assume the function of the former by means of an alternating gradual switching-on of the control signal components. When a coordinate transformer is used, on the other hand, a constant control signal may be derived or received at once in the polar coordinate system.

It is known that it is possible to carry out a coordinate transformation with the aid of a coordinate table and a tapping arm. The coordinate table consists of two crosshead guides having a cylindrical shape, for example, which are positioned parallel with respect to each other and rigid with regard to the frame. A slide travels thereon which carries a crosshead guide at a right angle to its direction of movement. Positioned at a right angle to this first system and in a plane thereabove is a second similar system. The point of intersection of the crosshead guides of the two systems on the slide serves as a coordinate point in the Cartesian system, and the individual movements serve as input signals in the x-y direction. The position of the point of intersection may be tapped as an output signal in polar coordinates when a tapping arm is provided for as a connection from this point of intersection to the coordinate origin. The point of intersection is formed by a slide ring which is common to both crosshead guides and which will come to be positioned at its point corresponding respectively to the mathematical coordination thereof. This arm is positioned in the coordinate origin; it is adapted to be extended and retracted telescopically and represents both the distance r from the coordinate origin and the angle to the coordinate abscissa. In order to achieve an actuation which is as devoid of force as possible, the slides of the coordinate table are driven by way of hydraulic amplifiers.

Also known is a coordinate transformer which drives the coordinate table with the aid of cables rather than by means of hydraulic power amplifiers. The positive drive is obtained by means of doubly provided cables. It is disadvantageous in this case that it is not possible to cover the entire field if, for example, a signal for a propulsion unit is involved which is not to fall below a specific value.

Furthermore, there exists the danger of coupling; in other words, the danger that both axles or shafts are actuated at the same time. In order to obviate this disadvantage regarding coupling effects, it is necessary to provide fur further structural elements, such as an excess pressure member. In the case of the use of cables, the actuation is additionally rendered difficult due to friction of the many reversing rollers.

Those skilled in the art therefore began to bypass the disadvantages and drawbacks of the gear systems referred to hereinabove by making use of a spatial cam gear as the coordinate transformer. Most suitable for the technical execution thereof are controller cylinders or drums which are not only rotatable about the longitudinal axis thereof but displaceable as well. Required for the formation of the polar coordinates are one cylinder or roller for the angle, and one for the distance or clearance and having a common drive. The cylinders or rollers are scanned in each case by a scanning member, and the respective position thereof is transmitted to a hydraulic amplifier. This amplifier is necessary in order to keep the manual forces as small as possible. In order that a positive drive or guided motion be achieved, a synchronously operating counter cylinder or roller is coordinated to each of the two cylinders or rollers. In the clearance between the two cylinders or rollers, which has if possible the same width in all positions, there extends and operates a scanning member in a manner such that both rollers or cylinders are touched simultaneously.

It is also known to use planar lever gear systems for coordinate transformers. These lever gear systems consist of a plurality of individual gear systems which individually execute each mathematical step. If a coordinate transformer is designed and plotted according to the signal flow sheet, a great number of individual gears are necessary therefor. One must provide for a gear unit which forms the square of a component; a further gear unit for the second component; a gear which forms the radical function, as well as a gear which forms the ratio 1:1 /r. Added thereto is a control gear which executes the multiplication, and finally a gear which forms or constitutes the sine function with respect to the coordinated angular value. In order to render it possible to fully drive this number of gear systems or units, two hydraulic amplifiers are required. This, in turn, results in an increased weight. It is most unfavorable in this case that for a mathematical addition, a differential lever is necessary which may cause a regenerative coupling. While a coordinate transformer of this type fully satisfies the respective requirements, it has the significant disadvantage that the control signal must pass through a considerable number of gear systems or units. The danger that the control paths be falsified due to elasticity, clearance and friction is rather great.

The present invention provides a coordinate transformer for transforming control signals for airplanes, particularly for transforming Cartesian input signals into polar output signals, which have, in addition to a thrust control element, a thrust direction control element or operating member for controlling the thrust components and, for uncoupling control axles.

This is achieved, in accordance with the present invention, by virtue of the use of two multi-sectional coupling gears or linkages; one linkage determining therein the distance $r$, while the other linkage determines the respectively coordinated angle $\alpha$ toward the polar axis from the two Cartesian x-y input signals. Because of the use of the linkages, there results a coordinate transformer which carries out the transformation of the coordinates in a completely controlled manner, and free of any play.

Applying the present invention to a VTOL aircraft, for the vertical take-off and landing phase, as well as for the transitional flight from vertical flight to horizontal flight, two factors are particularly important, namely, 1. the power unit or engine thrust and
2. the thrust direction of the power units or engines.

Two separate operating levers were formerly provided for these two factors. This resulted, however, in a very large workload for the pilot, who was required to continually reach over from one lever to the other and make corresponding adjustments. Since the starting and landing phases, as well as the transitional flight, require the full and undivided attention of the pilot, the object sought to be obtained in the present invention is to relieve the pilot of the workload as much as possible. For this reason, it was attempted, for example, to act upon the two aforementioned factors, i.e., the thrust and the thrust direction, by means of a common operating lever. This is attained, for example, by virtue of the fact that the control stick is mounted so as to be adapted to be inclined in all directions, so as to be displaceable in a Cartesian coordinate system. In this case, one coordinate is assigned to the thrust direction, and the other coordinate is assigned to the thrust intensity.

In actual practice, it has been found necessary to act upon the member to be regulated or adjusted, for example a lift engine, in the form of polar coordinates. This is based upon the fact that the thrust may be assumed or conceived to be a vector, whereby the length of the vector $r$ corresponds to the intensity of the thrust, and wherein the direction of the vector $r$ indicates the angle of emergence of the power jet, i.e., the thrust direction. It is, therefore, advisable to displace the mechanical device for varying the thrust direction, for example pivotal nozzles, about an angle $\alpha$ and to regulate the intensity of the thrust at the throttle by the amount $r$ of the vector.

The present invention provides a gear system which renders possible on a mechanical basis the conversion of quantities of magnitudes existing in the Cartesian coordinate system into a polar coordinate system, in which sufficiently high displacement or setting forces can be taken off at the output of the gear.

Figure 2:
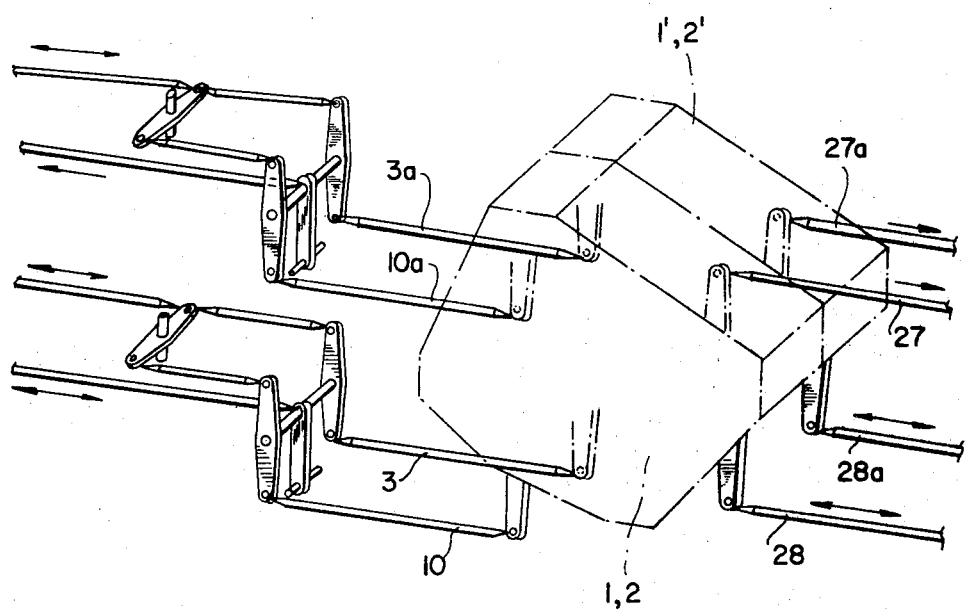

The present invention will be more fully described hereinafter on the basis of one embodiment thereof and taken in connection with the accompanying drawing, wherein FIG. 1 is a schematic representation of a coordinate transformer; and FIG. 2 shows the double provision of a coordinate transformer.

In FIG. 1, a coordinate transformer is schematically illustrated therein. The linkage 1 forms from the two Cartesian x-y input signals the distance r, and the other linkage 2 forms the coordinated angle $\alpha$ against the polar axis. The y-input signal member 3 normally acts upon a rocker arm or lever arm 4 being mounted in a suspended fashion at the frame 32 with a bearing axle 16. The end point 5 of the rocker arm 4 is connected by way of a couple 6 with a further counter rocker arm 7 whose other end is, in turn, mounted at the frame 32.

Secured approximately in the center of the counter rocker arm or lever arm 7 and normal with respect thereto is a double lever 9 by means of bearings 8. The x-input signal member 10 acts by way of an angle or toggle lever 12 being guided at the point of support 22 and by way of the couple 13 at the left end 11 of the double lever 9. At the other end 14 of the double lever 9 there is equally mounted a similar linkage system 15 connected to the angle lever 15a. The output member at the lever system 28 already constitutes the angle $\alpha$ toward the polar axis. This gear part is therefore designated as $\alpha$ gear.

Mounted at the bearing axles 16 and 22 to which latter the rocker arm 4, on the one hand, and the angle or toggle lever 12, on the other hand, are rotatably secured, in the extension of the axial lines, is a shaft each 30 and 31 which serve as drives for the second linkage 2. The second linkage serves as the square part of the gear system and consists first of all of a rocker arm 17 and/or 17' which is positioned approximately normal with respect to the position of the rocker arm or lever 4 and rigidly connected with the shaft 30 and/or 31. In the extension of the rocker arm 17 and/or 17', one couple each 18 and 18', is hingedly connected with the other ends thereof via another double lever 19 to the bearing ends 20 and/or 21. With the bearing 24 the double lever 19 is mounted at a rocker or lever arm 23. This lever 23 is in an approximately parallel position with respect to the double lever 19. The other end of the rocker arm or lever 23, in turn, is mounted at the frame 32. Additionally connected at the bearing 24 approximately parallel to the coupling rods 18 and 18' is an excess pressure member 25. Mounted adjoining the excess pressure member 25 there is — in an approximately straight extension — another angle or toggle lever 26 being mounted rotatably with regard to the frame. For purposes of restricting the path of the angle or toggle lever 26, a limit stop 29 is secured to the frame 32.

These two gear elements, i.e., the excess pressure member 25 and the angle or toggle lever 26, constitute the radical part of the gear. The double lever 19 corresponds to the adding lever. The output movement is already received at the output side of the angle lever 26 and corresponds to the distance r of the polar coordinate system.

This gear system follows the mathematical equation $$r = x^2 + y^2$$

and $\alpha =$ arc tan $y/x$.

Accordingly, the movements of the x-y input signals are converted in the linkage 1 into angular values against the polar axis. This gear system represents the mathematical function of the $\alpha$ gear unit or system. The linkage 2 consists of the square parts, an adding part or portion, as well as the adjacent radial portion in which the distance $r$ is determined.

It is apparent from FIG. 2 that the coordinate transformer also may be constructed as a dual coordinate transformer. In this case, the linkage 1, 2 may be used for the yaw control and for the horizontal acceleration via the lever systems 3, 10, 27 and 28. The other linkage 1', 2' serves for the rolling control and for the vertical acceleration via the lever systems 3a, 10a, 27a, and 28a. It is understood that this arrangement may be further expanded and used for aircraft with several thrust producing means. In the latter case, the thrust producing means may be controlled independently with respect to each other for control or navigating purposes.

By virtue of the construction of the coordinate transformer of the present invention, it has been rendered possible that each pilot is able to feed in Cartesian control signals but will obtain the signals in the polar coordinate diagram over the entire field. The advantages reside particularly in that a very wide control range is rendered possible with the aid of the invention. Tests have shown that the pivot angle may extend from 0° to 150°. The deviations from the mathematical relation that may still arise are very small in view of the fact that the two gear parts are driven by the unfalsified input signals x and y and are fully compensated by the aerodynamic lift. As a further area of application, the coordinate transformer may be employed for uncoupling the steering mechanism, for example the rolling and the yaw axes, as well as the accelerating axes.

It will be obvious to those skilled in the art that many modifications may be made within the scope of the present invention without departing from the spirit thereof, and the invention includes all such modifications.

What is claimed is:

1. In a coordinate transformer for transforming control signals for aircraft, particularly for transforming Cartesian input signals into polar output signals which aircraft have, in addition to a thrust control element, a thrust direction control element for controlling thrust components and uncoupling control axles, the improvement which comprises first and second multi-sectional linkage means connecting a control means adapted to be actuated by a pilot and a source of thrust, one of which linkage means determines the distance r, and the other of which determines the coordinated angle $\alpha$ towards the polar axis from the two Cartesian x-y input signals, said first linkage means including a y-input signal member connected to a first rocker arm mounted in a suspended manner on a frame, coupling means connecting the end of the first rocker arm with a second counter rocker arm, first double lever means mounted on the counter rocker arm, x-input signal means acting at one end of the double lever means through an angle lever means and a coupling means, means connected at the other end of the double lever means for measuring the angle with respect to the polar axis as an output member, and said second linkage means including a third rocker arm mounted on a shaft supporting said first rocker arm, the said rocker arms being mounted normal to each other, second double lever means hingedly connected at one end through a coupling means to the end of the third rocker arm, and the other end of said second double lever means being connected through a coupling means to a fourth rocker arm on a shaft supporting the angle lever means through which the x-input signal means acts, said second double lever means being supported in the center thereof by bearing means on a fifth rocker arm which is approximately parallel to the second double lever means, angle lever means acting through an excess pressure member at the bearing means, and linkage means connected to said angle lever means, the setting value of the output movement of the latter linkage means corresponding to the distance r.

2. A coordinate transformer according to claim 1 including at a first linkage means, a y-input signal member connected to a first rocker arm mounted in a suspended manner on a frame, coupling means connected the end of the rocker arm with a second counter rocker arm, first double lever means mounted on the counter rocker arm, x-input signal means acting at one end of the double lever means through an angle lever means and a coupling means, means connected at the other end of the double lever means for tapping the angle toward the polar axis of an output member, a third rocker arm mounted on a shaft supporting the first rocker arm, the said rocker arms being mounted normal to each other, second double lever means hingedly connected to one end through a coupling means to the end of the third rocker arm, and the other end of said second double lever means being connected through a coupling means to a fourth rocker arm on a shaft supporting the angle lever means through which the x-input signal means acts, said second double lever means being supported in the center thereof by bearing means on a fifth rocker arm which is approximately parallel to the second double lever means, angle lever means acting through an excess pressure member at the bearing means, and linkage means connected to said latter angle lever means, the setting value of the output movement of the latter linkage means corresponding to the distance r.

* * * * *